July 19, 1960

J. W. EDGEMOND, JR., ET AL

2,945,516

TILTING ARBOR TABLE SAW WITH COAXIAL
CONTROL OF ELEVATION AND TILT

Filed Dec. 31, 1956

INVENTORS
John W. Edgemond, Jr.
BY John J. O'Connor

ATTORNEYS

United States Patent Office 2,945,516
Patented July 19, 1960

2,945,516

TILTING ARBOR TABLE SAW WITH COAXIAL CONTROL OF ELEVATION AND TILT

John W. Edgemond, Jr., Los Altos, and John J. O'Connor, Menlo Park, Calif., assignors, by mesne assignments, to Yuba Consolidated Industries, Inc., San Francisco, Calif., a corporation of Delaware Filed Dec. 31, 1956, Ser. No. 631,820

1 Claim. (Cl. 143—36)

This invention relates to power saws and particularly to so-called table saws in which the saw blade is adapted to be raised and lowered with respect to a work piece supporting table and is also adapted to be tilted with respect to the table.

Power saws of this type are generally old and well known in the art but generally speaking devices of this kind have been equipped with two control devices. One of these devices, usually in the form of a crank or hand wheel, is provided to raise and lower the blade while a second crank or hand wheel is provided to tilt the blade.

It is an object of this invention to provide a device of this kind in which a single hand wheel or crank is provided and by the operation of which a user may control either the height of the blade (and depth of cut) or the angle of the blade (and the angle of the cut to be taken).

It is a further object of this invention to provide a device of this kind in which the control hand wheel is movable between two selected positions for either raising and lowering or tilting the blade.

It is a further object of this invention to provide a single control of this kind which is provided with suitable detent mechanism for releasably retaining the same in a selected position once the operation has been determined and the control positioned for that operation.

Generally speaking, prior devices of this type have been fabricated in such a manner as to render it necessary to provide a fabricated frame to which the operative portions of the saw are secured. A structure of this kind generally requires a plurality of parts each of which must be engineered not only to act as a frame member but as a support for some operative portion of the apparatus.

It is an object of this invention to provide an integral die cast front tub member which serves as a support for the front of the table, which forms positive stop elements which limit the tilt of the saw cradle, which forms a rack with which the tilting pinion cooperates and which provides surfaces which a locking nut may engage to lock the saw cradle in a selected tilted position.

Generally speaking, prior devices have utilized a tilt control mechanism comprising a lead screw and threaded nut arrangement. Moreover, generally speaking, these devices are slow in their action and considerable time has been required to tilt the saw blade. Most devices of this kind have utilized a machine thread type of device which is susceptible to contamination from gummy sawdust. Prior art devices have tended to jam for this reason.

It is an object of this invention to provide a tilt control which has a so-called "irreversible feature" provided by an epicyclic gear construction so that the cradle may be titled and retained in adjustment without locking.

It is a further object of this invention to provide a device of this kind which permits quick adjustment of the tilt of the saw blade by an efficient reduction mechanism which prevents loss of power.

It is a further object of this invention to provide a device of this kind which avoids contamination, that is, which is self-contained and dust free and therefore does not tend to jam or become dirty.

Generally in devices of this kind the size of the work piece is to some extent limited by the size of the work table.

It is an object of this invention to provide an outrigger type of table which will be provided either with solid or roller type supports for the work piece and which is also adapted to support a fence mechanism.

Generally speaking, in saws of this type it has been customary to mount the motor in such a way that belt tension is provided by the weight of the motor. Such mounting assumes that all belts are of the same length and all sections of the belt are uniform. This, however, does not happen to be the case. Since all sections of the belt are not identical, rapid driving of the belt sets up a resonant frequency. Moreover an operator may not operate the saw for some period of time with the result that the weight of the motor provides a "set" to the belt. When the motor is started this "set" creates resonance of a high order.

It is an object of this invention to provide a motor which is pivotally mounted in such a manner that belt tension is not dependent upon the weight of the motor but may be controlled by the operator independent of the motor's weight. Moreover we provide less belt tension on a lesser cut and greater belt tension is provided for a greater cut.

It is an object of this invention to provide a mounting of this kind which results in less vibration than in the prior art type of mounting.

It is a further object of this invention to provide a motor mounting of this kind which permits adjustment of belt tension when a jointer is utilized in connection with our device.

These and other objects of our invention will be made clear from the following specification taken in conjunction with the accompanying drawings in which.

As shown in the drawings, our invention consists primarily of a tub assembly 10 which supports the cradle upon which the saw is mounted and by which it is adapted to be tilted. The tub also supports the mechanism for tilting the cradle. The tub 10 supports the table 11 and is, in turn, supported upon a stand 12. An outrigger assembly 13 is secured to the table 11. Motor 14 which is pivotally mounted to the rear of the tub 10 is adapted to operate the saw blade 15.

The stand 12 is of any conventional type and its construction is unimportant except for the fact that it supports the entire mechanism at the proper height for its satisfactory use by an operator.

The tub assembly 10 consists of an integral die cast front portion 16 to which the side panels 17 and 18 may be secured in any suitable manner. The front portion 16 and the rear column portion of the side panels 17 and 18 support the table 11. A rear trunnion 19 is secured to the table 11 remote from and parallel to the die cast front member 16.

The front integral casting 16 and the rear trunnion are provided with arcuate slots 21 and 22 which are concentric and which support a cradle 23 which is provided with arcuate members 24 and 25, which may be secured thereto in any suitable manner, but which are adapted to be accommodated within the slots 21 and 22 respectively so that the cradle 23 may be moved arcuately about a line 26 on the table 11, which line is also the line at which the saw blade 15 projects through the top of the table 11. It will be apparent, therefore, that as the cradle 23 is swung about the line 26, the saw blade 15 which is supported by the cradle will likewise be tilted about the line 26 in such a manner that as a work piece is urged across the top of the table, the kerf or cut made by the blade 15 will be at the same angle. It will be noted that the members 24 and 25 are shorter in length than are the arcuate slots 21 and 22. This is, of course, an essential requirement of construction to permit the members 24 and 25 to move through the entire lengths of the arcs formed by the slots 21 and 22 whereby the blade 15 may be moved from a vertical position to a position of approximately 45° with respect thereto as illustrated, for example, in Figure 4.

As illustrated particularly in Figures 3, 4, 5, and 6, the saw blade 15 may be mounted upon an arbor 27 which, in turn, may be operatively secured to a shaft 28, which is accommodated in a suitable bearing assembly 29 mounted in a boss 31 on the casting 32. The shaft 28 also supports a pulley assembly 33. The casting 32 is rotatably supported on the cradle 23 by means of bolt 34. As the member 32 rotates about the bolt 34 it will be apparent that the saw blade 15 will be raised or lowered with respect to the table 11.

The arcuate portion 36 of the casting 32 is provided with teeth 37 and forms an arcuate rack 38 which is adapted to be engaged by a worm 39.

The casting 32 is provided with an arcuate slot 41 which cooperates with a bolt 42 which is fastened to the cradle 23 by a self locking nut 40. The bolt 42 is adapted to engage the ends of the arcuate slot 41 and limit the rotation of the member 32 with respect to the cradle 23 and, thus serves to limit the travel of the blade 15 between raised and lowered positions. The bolt 42 also serves to stabilize member 32 and serves as a secondary support for member 32. A bolt 43 which extends into the end of the slot 41 is adapted to, in effect, shorten the slot 41 and to engage the bolt 42 and thus limit the upward swing of the casting 32 and the blade 15.

The worm 39 (Figure 5) is secured in some suitable non-rotatable manner to a shaft 44 which is rotatably mounted in bosses 46 and 47 which are formed integrally with the cradle 23. The shaft 44 is provided with a tubular member 48 which is pinned or otherwise fixed thereto and whose open end is provided with a plurality of slots 49 which are adapted to be operatively engaged by a pin 51 on a shaft 52 whose operation will be more fully hereinafter described. However when the pin 51 engages any one of the slots 49 and the shaft 52 is rotated, it is apparent that the casting 32 will be caused to rotate about the axis of the bolt 34 until one end or the other of the slot 41 engages the bolt 42 and limits the raising or lowering of the blade 15. Thus it will be apparent that the raising or lowering of the blade 15 is controlled by the rotation of the tubular member 48 when the pin 51 engages one of the slots 49. It is equally apparent that when the pin 51 is not in engagement with one of the slots 49, that the shaft 52 may be rotated without affecting the height of the blade 15 or the position of the casting 32. That end of the shaft 52 remote from the pin 51 supports a control hand wheel 53 and rotation of the hand wheel 53 controls the shaft 52. It will be noted in Figure 4 that the shaft 52 is rotatably and slidably mounted in bosses 54 and 55 which are cast integrally with the cradle 23.

Figures 5, 11:
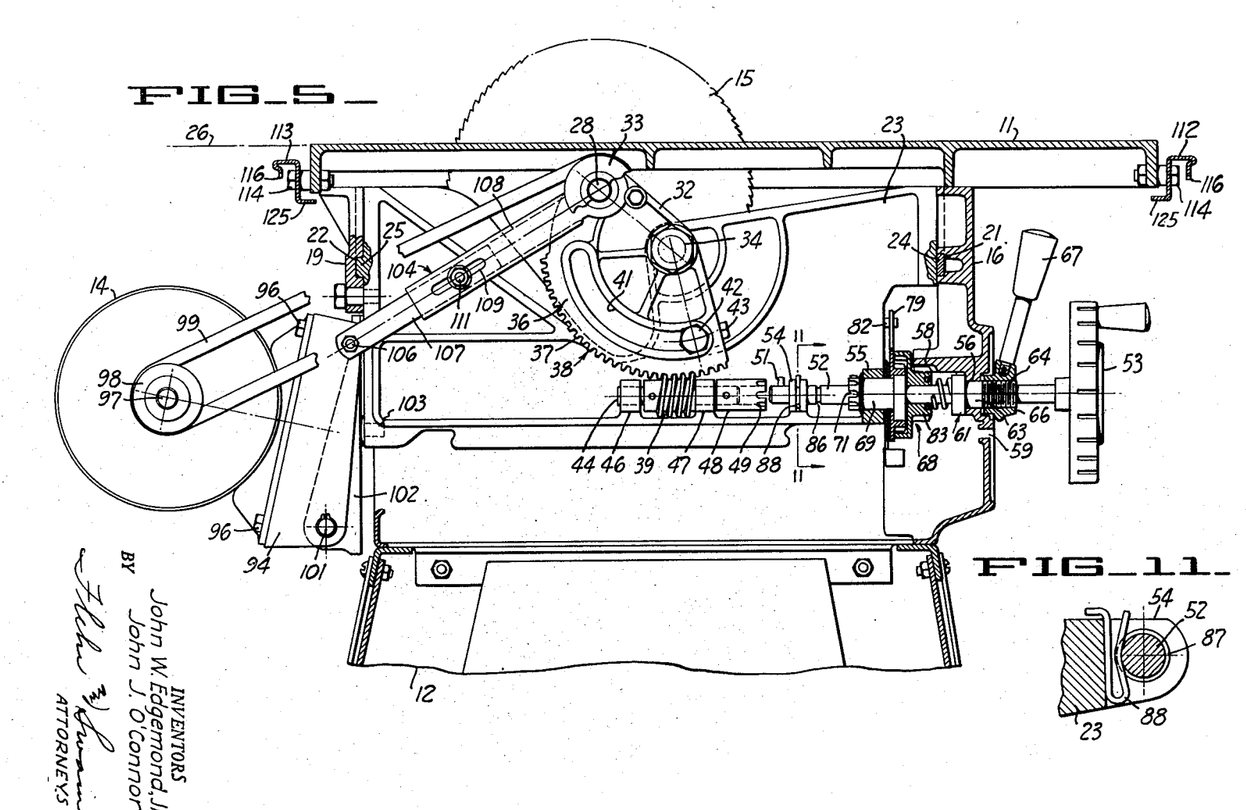
Figure 5 is a cross sectional view taken along the line 5—5 of Figure 3.
Figure 11 (sheet 5) is a view taken along the line 11—11 of Figure 5.
Figure 6:
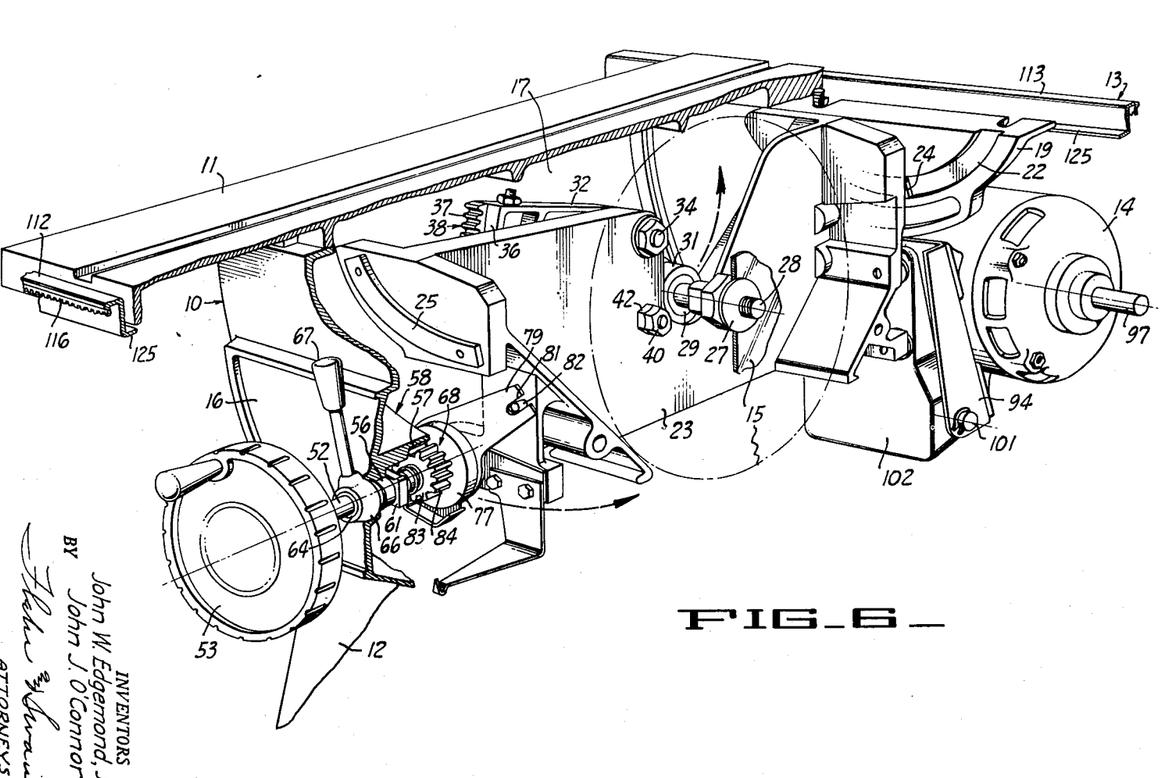
Figure 6 is a three-quarter view partially in section showing some of the details of our saw construction.

When the hand wheel 53 is urged to the dotted line position illustrated in Figure 5, the pin 51 engages one of the slots 49. Thus in the dotted line or retracted position, the hand wheel controls the raising and lowering of the blade 15. When the hand wheel 53 is in the forward or extended position (see Figure 5) then rotation of the hand wheel does not affect the height of the blade 15.

As has previously been pointed out herein the cradle 23 is mounted for swinging movement in the trunnions formed by the slots 21 and 22 in the front and rear castings 16 and 19 respectively and the arcuate members 24 and 25 on the fore and aft ends of the cradle 23. The mechanism for swinging the cradle is perhaps best illustrated in Figures 1, 4, 5, 6, 7 and 8.

The integral die cast front portion 16 is cast in such a manner as to provide an arcuate slot 56 and a plurality of teeth 57 which form an arcuate rack 58 which is concentric with the arcuate slot 56. A second arcuate slot 59 which is concentric with the slot 56 is also provided and its purpose will more fully hereinafter be set forth.

The shaft 52 extends through the arcuate slot 56 and is further adapted to move laterally along the length of the arcuate slot 56 and rotate therewithin. Movement of the shaft 52 along the slot 56 will, of course, result in swinging of the cradle 23 about its mounting trunnions and about the line 26.

We have provided means for locking the shaft 52 with respect to the arcuate slot 56. Such means comprises a block 61 which is provided with a squared portion 62 and a tubular portion 63 whose outer diameter is substantially identical to the width of the slot 56. The tubular member 63 is threaded at 64 along a substantial portion of its length and is adapted to receive a similarly threaded member 66 which is provided with a handle 67. By actuating the handle 67 the member 66 may be rotated upon the threads 64 and may be urged toward the squared portion 62 of the block 61. The two members 61 and 66, being on opposite sides of the casting 16 will frictionally engage that member so that the shaft 52 may not be moved along the length of the slot 56. However, by operating the handle 67 the member 66 may be rotated in the opposite direction with the result that the members 61 and 66 may be urged apart and out of engagement with the opposite sides of the member 16 with the result that the block 61 and the shaft 52 may be moved along the slot 56.

Figures 4, 8:
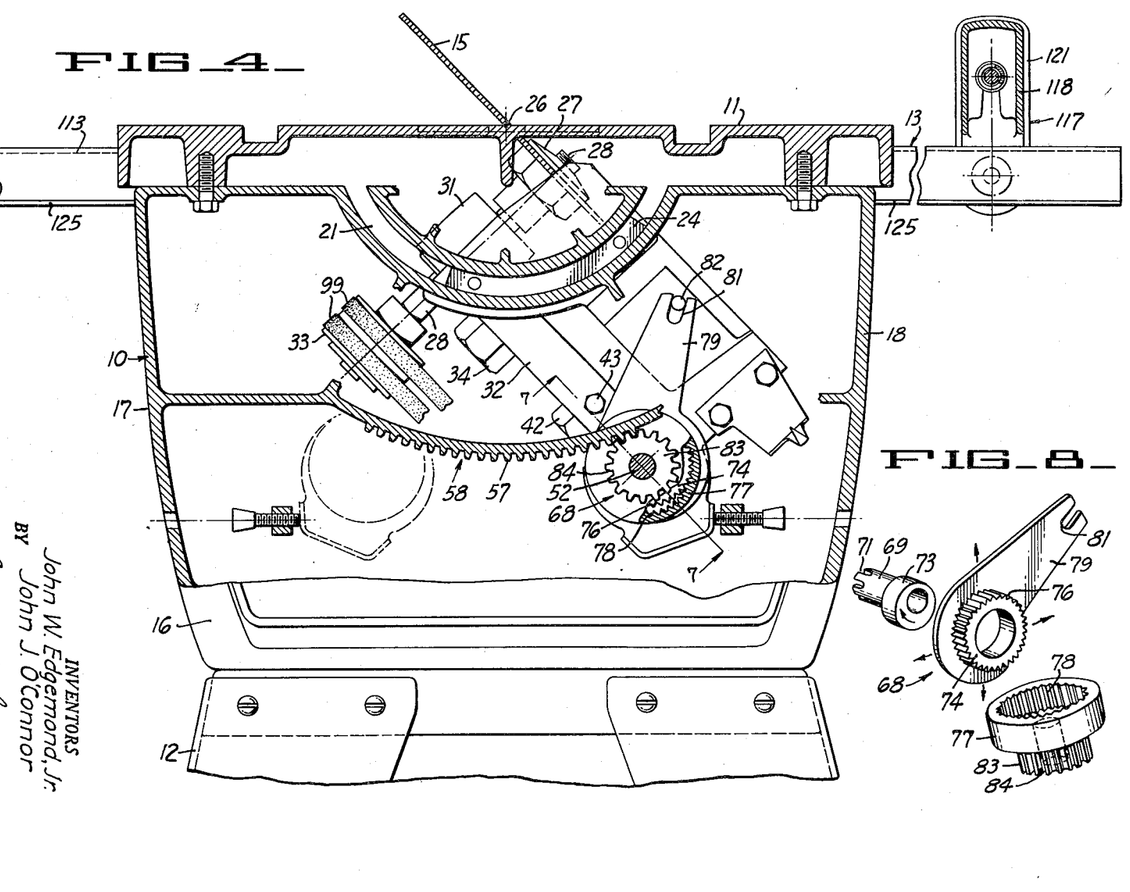
Figure 4 is a cross sectional detail taken along the line 4—4 of Figure 3.
Figure 8 (sheet 4) is an exploded view of the epicyclic gear construction illustrated in Figures 4 and 7.
Figure 7:
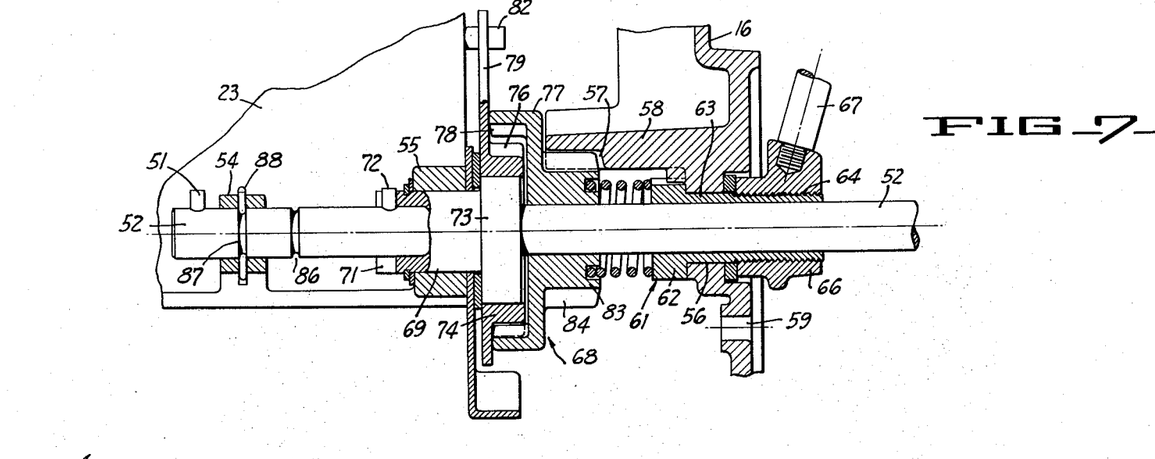
Figure 7 is a cross sectional view taken along the line 7—7 of Figure 4.

In order to control the movement of the shaft 52 along the slot 56, and thus control the tilting of the cradle 23, we have provided a drive gear assembly illustrated generally in Figures 4, 7 and 8. The drive gear assembly 68 consists of a sleeve member 69 which is rotatably mounted upon the shaft 52 and rotatably mounted in boss 55 which is part of cradle 23. At one end the member 69 is provided with slots 71 which are adapted to be engaged by a pin 72 (Figure 3) on the shaft 52. The other end of the tubular sleeve 69 is provided with a cam 73 (Figure 8) which is received by the inner circumference of a gear 74 whose outer periphery is provided with teeth 76 and whose outer diameter is considerably less than the inner diameter of a ring gear 77 with whose teeth 78 the teeth 76 are adapted to engage. Some of the teeth 76 and 78 are in constant mesh. A plate 79 is fixed to the member 74 and it is provided with a slot 81 which is adapted to engage and slide with respect to a pin 82 which is fixed to the cradle 23. The ring gear 77 is provided with a toothed gear extension 83 whose teeth 84 are adapted to engage the teeth 57 on the rack 58. The member 83 is also rotatably mounted upon the shaft 52.

When the shaft 52 is rotated and the pin 72 is in engagement with one of the slots 71 in the member 69, the cam 73 will be rotated. The gear 74 will be caused to oscillate about the axis of the cam 73 and as the gear 74 oscillates its teeth 76 will engage teeth 78 of the member 77 causing that member to rotate about the axis of the shaft 52 upon which it is mounted. As the member 77 rotates, the member 83 will likewise rotate and the teeth 84 thereon will engage the teeth 57 of the rack 58 thereby urging the shaft 52 laterally along the slot 56. The entire assembly 68 is self-contained and free of dirt and contamination.

It will be noted in Figures 5, 7 and 11 that the shaft 52 is provided with a pair of circumferential grooves 86 and 87. It will also be noted in Figure 11 that a spring detent 88 is supported in boss 54 and is adapted to engage either one of the grooves 86 or 87 as the shaft 52 is moved to retracted or extended position as the same has previously been defined. Thus when the shaft 52 is urged to the left, as viewed in Figure 5, and the hand wheel 53 occupies the dotted line position illustrated therein, the pin 51 will engage one of the slots 49 and the saw blade raising and lowering mechanism will be actuated to raise and lower the blade 15. The detent 88 tends to retain the shaft 52 in that position until its effect is overcome by an operator. When the shaft 52 is in this position, it is, of course, apparent that the pin 72 will not engage one of the slots 71. However when the shaft 52 is urged to the right, as viewed in Figure 5, and the hand wheel 53 occupies the full line position illustrated therein, the detent 88 will become disengaged from groove 86 and will engage the groove 87 and the pin 51 will become disengaged from the slots 49. However the pin 72 will engage one of the slots 71 and when the shaft 52 is rotated the cradle 23 will be swung about the line 26 in the trunnions formed by the slots 21 and 22 and the arcuate members 24 and 25. Thus it will be seen that the shaft 52 and the hand wheel 53 provide a single common control means for raising and lowering the saw blade 15 with respect to the table and for tilting the saw blade 15 with respect to the table.

Operation of the blade raising and lowering and tilting mechanism and the common control means therefor may briefly be described as follows:

Let it be assumed that the blade 15 is mounted upon a suitable arbor 27 which is secured to the shaft 28 which is rotatably mounted in the bearing 29 in the boss 31 on the movable casting 32. The cradle 23 which supports the casting 32 is mounted for swinging movement in the trunnions formed by the slots 21 and 22 and the arcuate members 24 and 25 respectively.

In the event the operator wishes to raise or lower the blade 15 with respect to the table 11, he urges the hand wheel 53 inwardly or to the left or dotted line position illustrated in Figure 5. When the hand wheel 53 is thus positioned, the pin 51 engages one of the slots 49 on the tubular member 48. The pin 72 will become disengaged from any of the slots 71 on the member 69. The detent 88 will engage the groove 86. Rotation of the hand wheel 53 will rotate the shaft 52 and the worm 39 which is in constant mesh with the teeth 37 on the arcuate rack 38 will move the casting 32 about the pivot 34 within the limits defined by the ends of the arcuate slot 41. Thus, depending upon the direction of rotation of the hand wheel 53, the blade 15 will be raised or lowered with respect to the top of the table 11.

When the blade height has been thus selected, the hand wheel 43 is retracted or drawn to the right to the full line position illustrated in Figure 5. The pin 51 becomes disengaged from one of the slots 49 and the pin 72 engages one of the slots 71 in the member 69. The detent 88 will then engage the groove 87. As the hand wheel 53 is rotated, the rotary motion of the shaft 52 will be transmitted to the gear 83 whose teeth 84 are in constant mesh with the teeth 57 in the arcuate rack 58. This will result in movement of the shaft 52 along the slot 56 until the cradle 23 and the saw 15 have been tilted about the axis or line 26. When the desired degree of tilt has been accomplished, the handle 67 may be rotated in such a manner that the member 66 and the block 61 are urged toward each other into clamping engagement with the opposite walls of the member 16. Thus the cradle will be locked in the desired position. When it is desired that a different degree of tilt be given to the saw blade 15, the handle 67 may be actuated to release the member 66 and the block 61 from clamping engagement with the member 16 with the result that the cradle 23 may be swung to a different position. It will be noted that the shaft 52 may be rotated even though the handle 67 is in locking position. Thus the blade 15 may be raised and lowered while the cradle 23 is locked against movement about the trunnion.

Thus it will be seen that we have provided a single control mechanism, that is the handle 53, by which the blade 15 may be raised or lowered to determine the depth of cut and by which it may be tilted with respect to the top of the table 11 to determine the degree or angle of the cut.

The motor 14 is mounted upon a base 94 by suitable bolts 96. The motor 14 is provided with a drive shaft 97 upon which a pulley 98 is mounted. The pulley 98 accommodates the belts 99 which also pass over the pulley 33 on the shaft 28. In this manner the motor 14 drives the saw blade 15.

The base 94 is pivotally mounted at 101 to a plate 102 which is secured to the cradle 23 and which is adapted to move with the cradle 23 about the axis or line 26. The plate 102 may be secured to the cradle 23 in any suitable manner as by means of bolts 103. The base 94 is connected through a linkage 104 to the casting 32. The linkage 104 is pivotally connected at 106 to the base 94 and consists of a pair of relatively slidable members 107 and 108. The member 108 is provided with a slot 109 which is adapted to accommodate a bolt 111 which is keyed by a square shoulder against rotation in the member 107. The member 108 is pivotally connected to the member 32 at the boss 31 on the casting 32 and its pivotal connection therewith is concentric to the axis of shaft 28.

The length of the linkage 104 can, of course, be determined by loosening the bolt 111 and re-tightening the same with respect to the slot 109. The linkage 104, once its length has been determined, will, of course, be actuated by movement of the casting 32.

It will be apparent from the foregoing that the tension upon the belts 99 is determined by the linkage 104 and not by the weight of the motor 14 as is customary. Moreover, the tension upon the belts 99 is determined by the height of the blade 15 and is directly responsive thereto.

Figures 1, 9, 10:
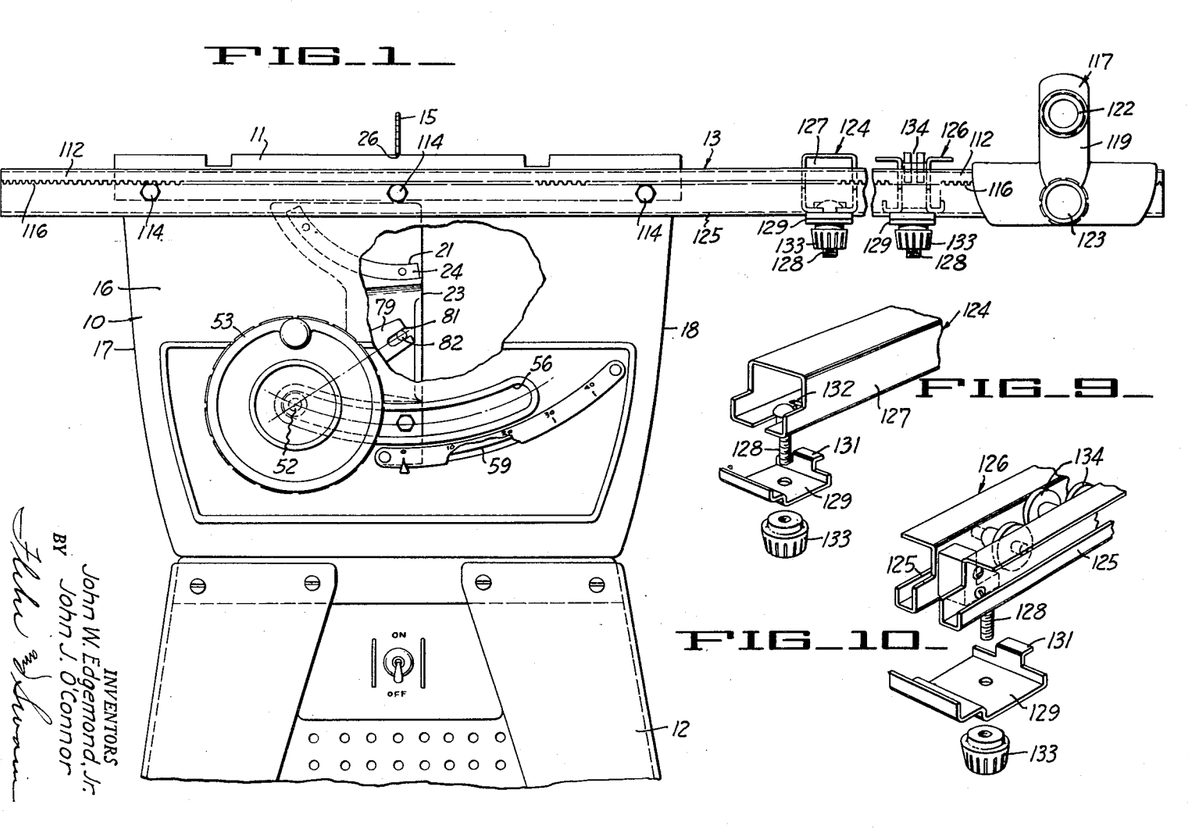
Figure 1 represents a front view, partially in cross section, of a table saw incorporating our invention.
Figure 9 (sheet 1) is an end view of the outrigger table construction illustrated in Figure 1.
Figure 10 is an end view of one form of the outrigger construction illustrated in Figure 1.
Figure 2:
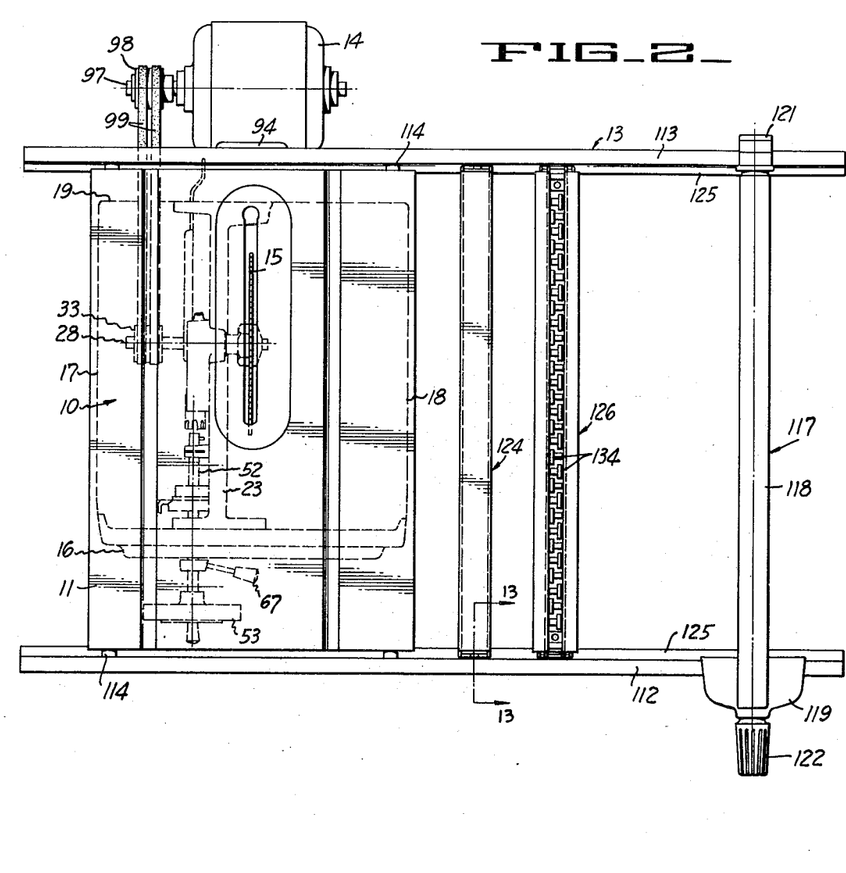
Figure 2 is a top plan view of a table saw incorporating our invention illustrating a portion of the device in dotted lines.
Figure 3:
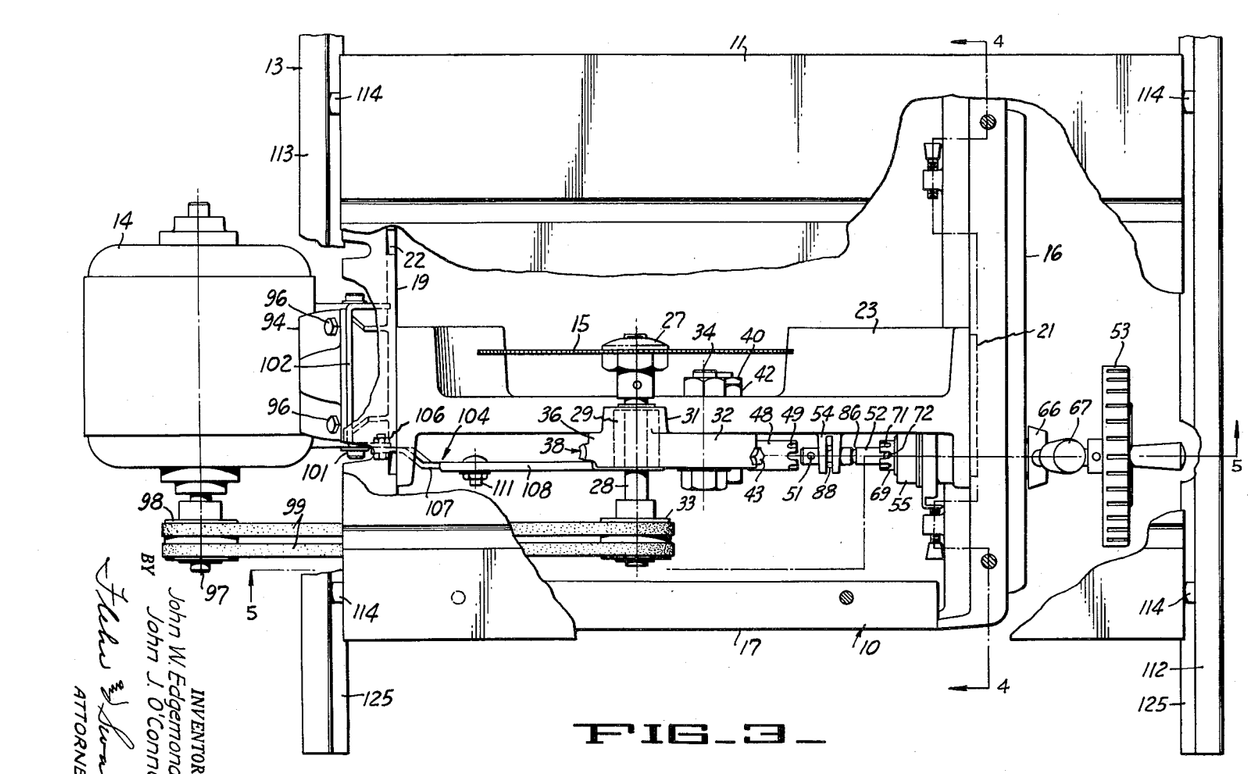
Figure 3 is a view similar to Figure 2 except that a portion of the table has been removed and a portion of the saw is more clearly illustrated.

The table 11 is provided with a plurality of outwardly extending members 112 and 113 which are formed generally as illustrated in Figure 5 and which are mounted as shown in Figures 1 and 2. The outrigger members 112 and 113 are secured to the front and rear edges of the table 12 by means of bolts 114. Although the members 113 and 112 are shown extending to the right, as viewed in Figure 2 for example, they may be caused to extend to the left.

The turned lip portion of the member 112 is provided with teeth 116.

Figure 12:
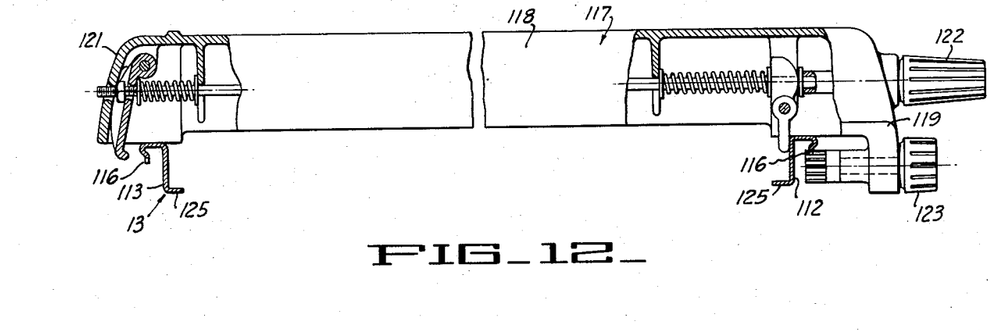
Figure 12 (sheet 7) is a side elevational view, partially in cross section, of the fence.
Figure 13:
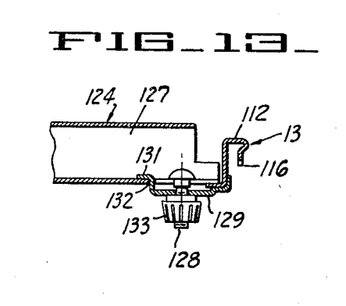
Figure 13 (sheet 2) is a cross sectional detail taken along the line 13—13 of Figure 2.

The members 112 and 113 are adapted to accommodate a fence 117. The fence 117 consists of a vertical or upright portion 118 and end portions 119 and 121 (Figure 12). The member 119 accommodates a control knob 122 and the entire fence assembly 117 is substantially identical to that described in copending Edgemond et al. application Serial No. 494,468 filed March 15, 1955, for a "Combination Power Tool."

As described in that application the fence is provided with locking means which is responsive to the control knob 122. When the knob 122 is tightened, the locking member in the member 119 first engages extending member 112. Rotation of the knob 122 also operates a clamping device mounted in the assembly 121 which tends to lock that assembly to the member 113. The clamping assembly in the member 119 engages the member 112 before the clamping assembly in the member 121 engages the member 113, and thus, since the member 121 is provided with an enlarged flat surface which bears against the forward edge of the member 112, the fence assembly 117 will be properly aligned when the front clamping member locks the member 119 against the member 112. Continued rotation of the knob 122 will lock the clamping member in the assembly 121 to the rear outrigger 113. Thus it will be seen that the fence 117 may be locked at any point along the length of the members 112 and 113 and that the length of the work piece is not limited by the size of the surface of the table 11. The member 121 is also provided with a second knob 123 which actuates a shaft upon which a suitable toothed gear is mounted which gear engages the teeth 116 whereby, when the knob 122 is loosened, and the knob 123 is rotated, the toothed member will engage the teeth 116 and move the fence laterally along the members 112 and 113.

Members 112 and 113 also accommodate one or more work piece support members 124 or 126 (Figures 1 and 2).

The work piece support member 124 as illustrated in Figure 9 consists of a square member 127 which is adapted to ride on the inturned flanges (see Figure 5), 125 on the members 112 and 113 respectively. The front end of the member 127 is provided with a slot and a downwardly extending threaded member 128 which is adapted to receive a plate 129. The plate 129 is provided with a rearwardly extending lip 131 which is accommodated within a slot 132 in the bottom of the member 127. A nut 133 is adapted to be mounted on the threaded member 128. When the assembly illustrated in Figure 9 is properly assembled, the lower surface of the tubular member 127 rides on top of the flange 125 and the plate 129 rides thereunder. When the member 133 is tightened, the member 124 is locked with respect to the guide 112 and the device is locked with respect thereto. The clamp plate 129 is also used at the opposite ends of 127 and 126 to also clamp on the flange 125 of 113.

The work piece support member 126 illustrated in Figure 10 is provided with locking means substantially identical to that described in connection with the device 124 illustrated in Figure 9. However the upper surface of the member 126 is not flat as is the upper surface of the member 124 but it is provided with an elongated slot which accommodates a plurality of rotatable members 134. The plane of the upper edges of the rotatable members 134 is coplanar with the upper surface of the table 11 so that a work piece, one of whose ends is supported by the table 11 will also be supported by the members 134. Since the members 134 are rotatable frictional engagement between the work support member 126 and the work piece is reduced to a minimum.

We claim:

A casting forming the front of a tub support for a table saw in which the saw cradle may be tiltably mounted in an arcuate front trunnion, in which the controls for raising and lowering and tilting the saw extend through an arcuate slot, in which the means for tilting the saw comprises a fixed arcuate rack arranged to mesh with a rotatable pinion, in which the saw may be locked in a predetermined raised or lowered position by a locking shoe adjacent said controls and engaging a locking surface, and in which the angle of tilt is limited by a pair of stops; said casting being characterized in that the front trunnion, the arcuate slot, the arcuate rack, and the locking surface are concentric and the stops are formed in a predetermined position with respect to said trunnion, slot, rack, and locking surface.

References Cited in the file of this patent

UNITED STATES PATENTS

| | | |
|---|---|---|
| 1,938,548 | Tautz | Dec. 5, 1933 |
| 2,121,069 | Collins | June 21, 1938 |
| 2,168,282 | Tautz | Aug. 1, 1939 |
| 2,265,407 | Tautz | Dec. 9, 1941 |
| 2,325,082 | Tautz | July 27, 1943 |
| 2,661,777 | Hitchcock | Dec. 8, 1953 |
| 2,690,084 | Van Dam | Sept. 28, 1954 |
| 2,695,638 | Gaskell | Nov. 30, 1954 |
| 2,711,762 | Gaskell | June 28, 1955 |
| 2,758,615 | Mastriforte | Aug. 14, 1956 |

FOREIGN PATENTS

| | | |
|---|---|---|
| 205,623 | Great Britain | Oct. 25, 1923 |